United States Patent [19]
Fesland et al.

[11] Patent Number: 5,728,965
[45] Date of Patent: Mar. 17, 1998

[54] METHOD AND DEVICE FOR THE SCATTERING OF DRONES ON CURVED PATHS AROUND ONE OR MORE REFERENCE POINTS

[75] Inventors: Sylvain Fesland, Montlouis S/Loire; Pascal Nigron, Fresnes, both of France

[73] Assignee: Thomson-CSF, Paris, France

[21] Appl. No.: 628,108

[22] Filed: Apr. 9, 1996

[30] Foreign Application Priority Data

Apr. 13, 1995 [FR] France .................. 95 04457

[51] Int. Cl.⁶ ............................................. F41G 7/00
[52] U.S. Cl. ................................... 89/1.11; 244/190
[58] Field of Search ..................... 89/1.11; 244/190, 244/189, 3.11, 3.14

[56] References Cited

U.S. PATENT DOCUMENTS

| | | | |
|---|---|---|---|
| H628 | 4/1989 | McIngvale | 342/33 |
| 4,157,544 | 6/1979 | Nichols | 342/34 |
| 4,510,499 | 4/1985 | Chisholm et al. | 342/456 |
| 4,997,144 | 3/1991 | Wolff et al. | 244/3.14 |
| 5,317,320 | 5/1994 | Grover et al. | 342/59 |
| 5,340,056 | 8/1994 | Guelman et al. | 244/3.16 |
| 5,521,817 | 5/1996 | Burdoin et al. | 364/423 |
| 5,581,250 | 12/1996 | Khvilitzky | 340/961 |

FOREIGN PATENT DOCUMENTS 2 231 220 11/1990 United Kingdom .

*Primary Examiner*—Michael J. Carone
*Assistant Examiner*—Christopher K. Montgomery
*Attorney, Agent, or Firm*—Oblon, Spivak, McClelland, Maier & Neustadt, P.C.

[57] ABSTRACT

The disclosure relates to the deployment and maintenance of a belt of autonomous sensors fitted out with warning sensors to monitor the area surrounding one or more sensitive points. It relates especially to anti-missile and anti-aircraft warning systems for naval surface ships against missiles and aircraft flying at low and very low altitudes. It consists in controlling the paths of the drones solely by means of their radius of curvature for which they receive an instructed value from the reference point or points. This instructed value is encoded by a frequency of a radioelectric signal sensitive to the Doppler effect. A modification of this instructed value of radius of curvature as a function of the signal of a proximity sensor makes it possible to avoid all problems of collision and to keep the drones at equal distance from one another. This mode of control proves to be particularly efficient and, at the same time, very simple.

10 Claims, 3 Drawing Sheets

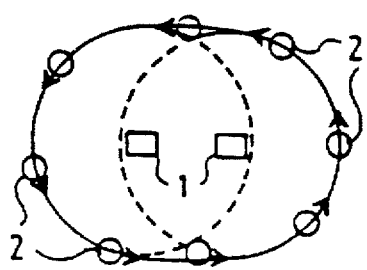
FIG.4a
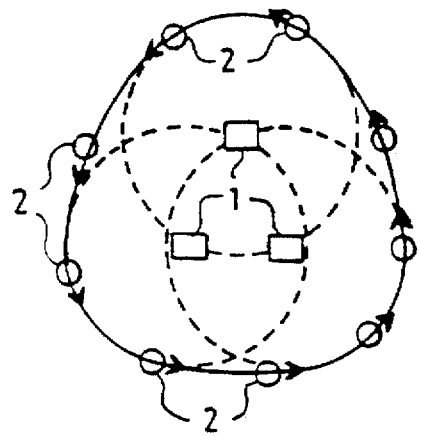
FIG.4b
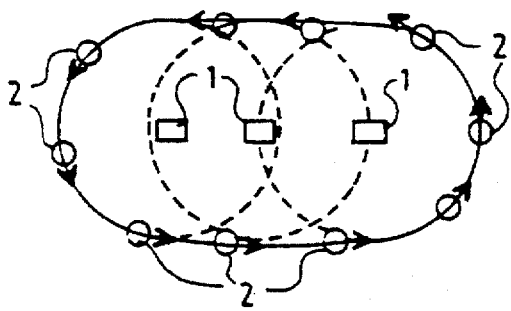
FIG.4c
FIG.5
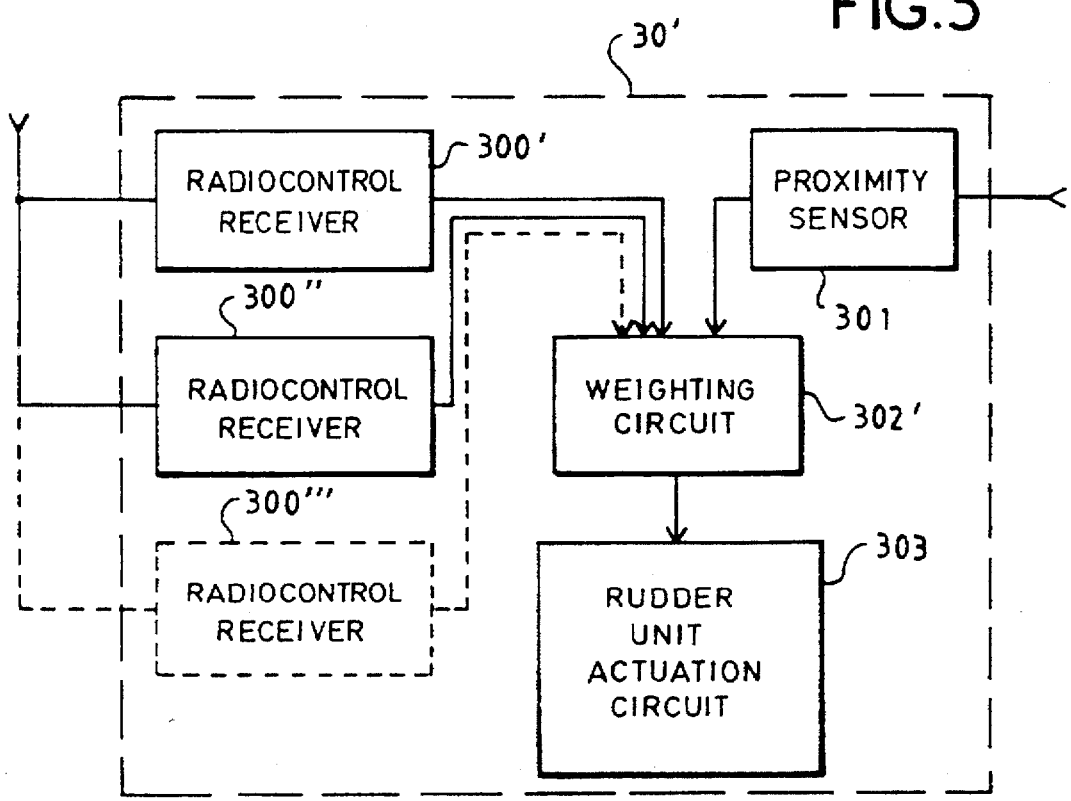

1

METHOD AND DEVICE FOR THE SCATTERING OF DRONES ON CURVED PATHS AROUND ONE OR MORE REFERENCE POINTS

BACKGROUND OF THE INVENTION

1. Field of the Invention

The present invention relates to the deployment and maintenance of a belt of autonomous drones fitted out with warning sensors to monitor the area surrounding one or more sensitive points. It relates in particular to anti-missile and anti-aircraft warning systems for naval surface vessels against missiles and aircraft flying at low and very low altitudes.

The maximum distance at which it is possible envisage the detection of missiles or aircraft flying at low altitudes or very low altitudes through the use of the means on board a ship is only 10 to 15 km. This is because of environmental constraints such as the roundness of the earth, sea clutter and the image effect. This belated detection limits the reaction time of the anti-aircraft defence and to that extent shortens the survival time of the ship.

The early warning should therefore be given, by means external to the ship. The solutions presently operational in navies consist of forward surveillance aircraft whose use can be contemplated only in the proximity of friendly forces or by a naval force comprising an aircraft carrier.

2. Description of the Prior Art

One approach using drones, which are small-sized radio-controlled unmanned aerial vehicles (UAV), could be envisaged, for these vehicles have the advantage wherein they can be used by vessels other than aircraft carriers. However they have a small payload, of the order of some 40 kilograms, which limits the range of the warning sensor and of the instruments that can be fitted into them and which means that an omnidirectional anti-aircraft or anti-missile warning system must comprise a large number of drones, several tens of them travelling around the ship that is to be protected.

There then arises the problem of controlling the paths of the drones from the protected ship during their deployment, operation and retrieval. A radio guidance system taking account of the instantaneous relative positions of the drones with respect to the protected ship proves to be cumbersome to manage because it has to control the flight plans in order to avoid collision among drones and at the same time distribute the drones around the protected ship in taking account of the performance characteristics of the warning sensors which may vary as a function of local conditions of operation (such as rain, fog, the relief, etc.).

An aim of the invention is to achieve the greatest possible simplification of the control of the paths of drones from one or more low-speed mobile points.

SUMMARY OF THE INVENTION

An object of the invention is a method for the scattering of drones on curved paths around one or more reference points wherein each reference point is equipped with a radiocontrol transmitter tuned to a particular tuneable frequency representing an instructed value of radius of curvature of a path increasing and decreasing with the frequency transmitted and wherein each drone is fitted out firstly with radiocontrol receivers, the number of which is at least equal to that of the radiocontrol transmitters of the reference points, each tuned to the transmission frequency of one of said transmitters and provided with frequency detection circuits decoding the instructed values of radius of curvature transmitted on the basis of the different apparent frequencies received coming from the transmitters of the different reference points, a weighting circuit weighting the instructed values of radius of curvature received from the different frequency detection circuits of the radiocontrol receivers and a rudder unit actuating circuit implementing the weighted instructed value of radius of curvature delivered by the weighting circuit.

The Doppler effect that increases the frequency of the wave received when the transmitter approaches the receiver and that reduces it when the transmitter moves away from the receiver prompts an apparent variation of the instructed values of radius of curvature. This tends to increase the radius of curvature of the path of a drone when a transmitter approaches it and to reduce the radius of curvature of the path of the drone when a transmitter moves away from it, and thus plays a role in keeping the transmitter at the center of the path of a drone.

The risks of collision among drones may be avoided by distributing the drones at different levels of altitude, while their regular distribution on curved paths around reference points may be obtained by a gradual deployment. However, owing to inevitable differences of speed and path between drones, the distribution of the drones around the reference point tends to lose its regular character in the more or less long term.

To resolve this problem as well as to avoid collisions among drones flying at the same altitude, the above method for the scattering of zones is advantageously supplemented by fitting out the drones with proximity sensors modifying the instructed value of radius of curvature of their path so as to move them away as soon as the proximity sensor detects that they are too close to another drone.

To prevent problems of gaps in the monitoring coverage, the drones are advantageously fitted out with proximity sensors that modify the instructed value of radius of curvature of their paths not only to move them away as soon as their proximity sensor detects that they are too close to another drone but also to bring them closer as soon as their proximity sensor detects that they are too far from the nearest drone.

Advantageously each drone is fitted out, in the rear, with a proximity sensor so as to detect whether it is being followed too closely or at too great a distance by another drone, said proximity sensor generating a command for reducing the radius of curvature of the path of the drone into which it is fitted in the event of a detection of an excessive proximity to another drone or a command for increasing the radius of curvature of the path of the drone in the event of a detection of an excessively great distance from the nearest drone.

Thus, a drone that is followed too closely by another drone on its path around one or more reference points comes closer to the reference points to increase its angular speed on its curved path and to move away from the other drone. Conversely, if it is followed at too great a distance by the nearest drone, it moves away from the reference points to reduce its angular speed on its curved path and allow itself to be caught up with.

An object of the present invention is also a device for the implementation of the above-mentioned method for the scattering of drones on curved paths around one or more reference points comprising:

at each reference point:
* a radiocontrol transmitter tuned to a particular tuneable frequency representing an instructed value of radius of curvature of a path increasing and decreasing with the transmitted frequency, on each drone:
* radiocontrol receivers, the number of which is equal to that of the radiocontrol transmitters of the reference points, each tuned to the transmission frequency of one of said transmitters and provided with frequency detection circuits decoding the instructed values of radius of curvature transmitted on the basis of the apparent frequencies received coming from the transmitters of the different reference points,
* a weighting circuit weighting the instructed values of radius of curvature received from the different frequency detection circuits, and
* a rudder unit actuating circuit implementing the weighted instructed value of radius of curvature delivered by the weighting circuit.

Advantageously, to enable the distribution of the drones around the reference points and prevent collisions among drones flying at the same altitude, the device for the implementation of the scattering method furthermore comprises, on each drone, a proximity sensor modifying the weighted instructed value of radius of curvature of the drone into which it is fitted by the introduction, at input of the weighting circuit, of an instructed value of modification of the radius of curvature in a sense that tends to move the drone into which it is fitted away from another excessively close drone or to bring the drone into which it is fitted closer to another excessively distant drone.

Advantageously, the proximity sensor into which each drone is fitted is mounted in the rear of each drone so as to detect whether a drone is being followed by another drone at an excessively small distance or at an excessively great distance and generates either a command to reduce the radius of curvature of the path of the drone into which it is fitted whenever it detects the excessively great proximity of another drone or a command to increase the radius of curvature of the path of the drone into which it is fitted whenever it detects an excessively great distance from the drone that is following it.

BRIEF DESCRIPTION OF THE DRAWINGS

Other characteristics and advantages shall emerge from the following description of an embodiment given by way of an example. This description is made with reference to the appended drawings, of which:

FIGS. 4a, 4b and 4c represent forward surveillance systems for a fleet of ships having various positions, using drones patrolling around the fleet; and FIG. 5 is a block diagram of autonomous navigation equipment for a drone adapted to command by a fleet of ships.

MORE DETAILED DESCRIPTION

Figure 1:
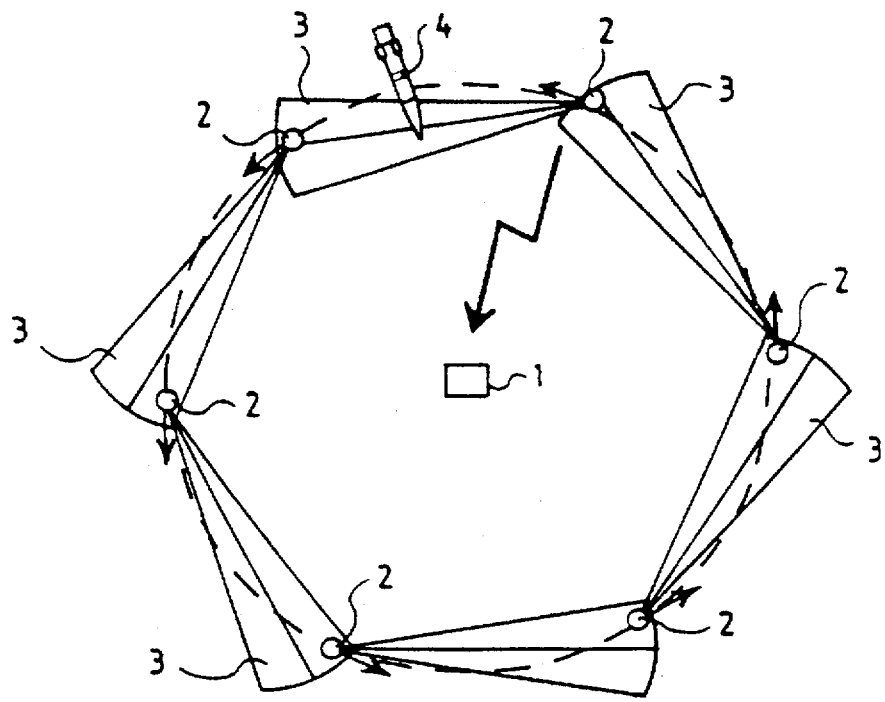
FIG. 1 shows a forward surveillance system for a ship by means of drones placed in circles around the ship using the scattering method according to the invention.

FIG. 1 shows a forward tracking system for a ship 1 consisting of six drones 2 patrolling in a circle at the same speed around the ship 1 at a distance of about 25 to 30 km. The drones 2 are evenly distributed around the ship 1 and are fitted out with a nose cone radar illuminating a sector 3 covering a zone extending over a distance of about 30 km in order to achieve no-gap coverage and detect any threat 4 wherever it may be coming from. The paths of the drones 2 are managed autonomously. The ship 1 regulates only the radius of the belt of deployment of the drones while each drone positions itself individually on its path in relation to the drone that follows it and in relation to the ship.

Figure 2:
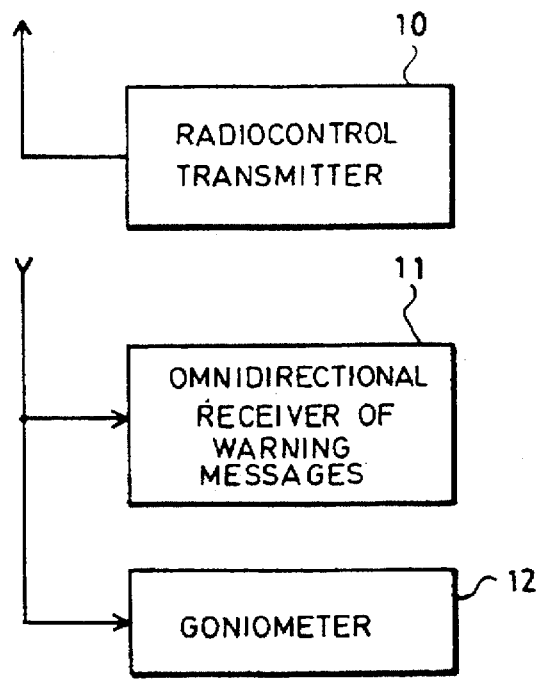
FIG. 2 is a block diagram of the equipment of a ship for links with drones.

The ship is fitted out, as can be seen in FIG. 2, with a radiocontrol transmitter 10 and an omnidirectional warning message receiver 11 associated with means 12 for determining the direction from which the warning messages come.

The radiocontrol transmitter 10 is tuned to a particular tuneable frequency representing an instructed value of radius of curvature of a path increasing and diminishing with the frequency transmitted. On a secondary basis, it is capable of sending out a message, which may or may not be individualized, to deactivate the drone.

The omnidirectional warning message receiver 11 is capable, at all times, of receiving the warning messages coming from the drones patrolling around the ship.

The means 12 for determining the direction from which the warning messages come may be radiogoniometer type means or may be based on the identification of the instantaneous direction of the reception antenna of the omnidirectional warning message receiver 11 when this receiver is directional and rotational.

The drones fly at constant speed and at constant altitude on curved paths around the ship. They may perform maneuvers in the horizontal plane by means of a rudder unit. Each of them is fitted out, as can be seen in FIG. 3, with a sector coverage nose cone radar sensor 20 capable of detecting a threat in front of it, a lateral antenna based warning message transmitter 21 oriented laterally towards the ship and an independent navigation system 30.

The radar sensor 20 triggers the warning message transmitter 21 as soon as it detects a threat. The warning message sent out towards the ship 1 is received by the omnidirectional warning message receiver 11 of the ship 1. This ship, in association with the direction determining means 12, determines the direction from which the warning message is coming and informs the command center of the ship 1 of the threat and its direction so that appropriate protective measures can be taken.

Figure 3:
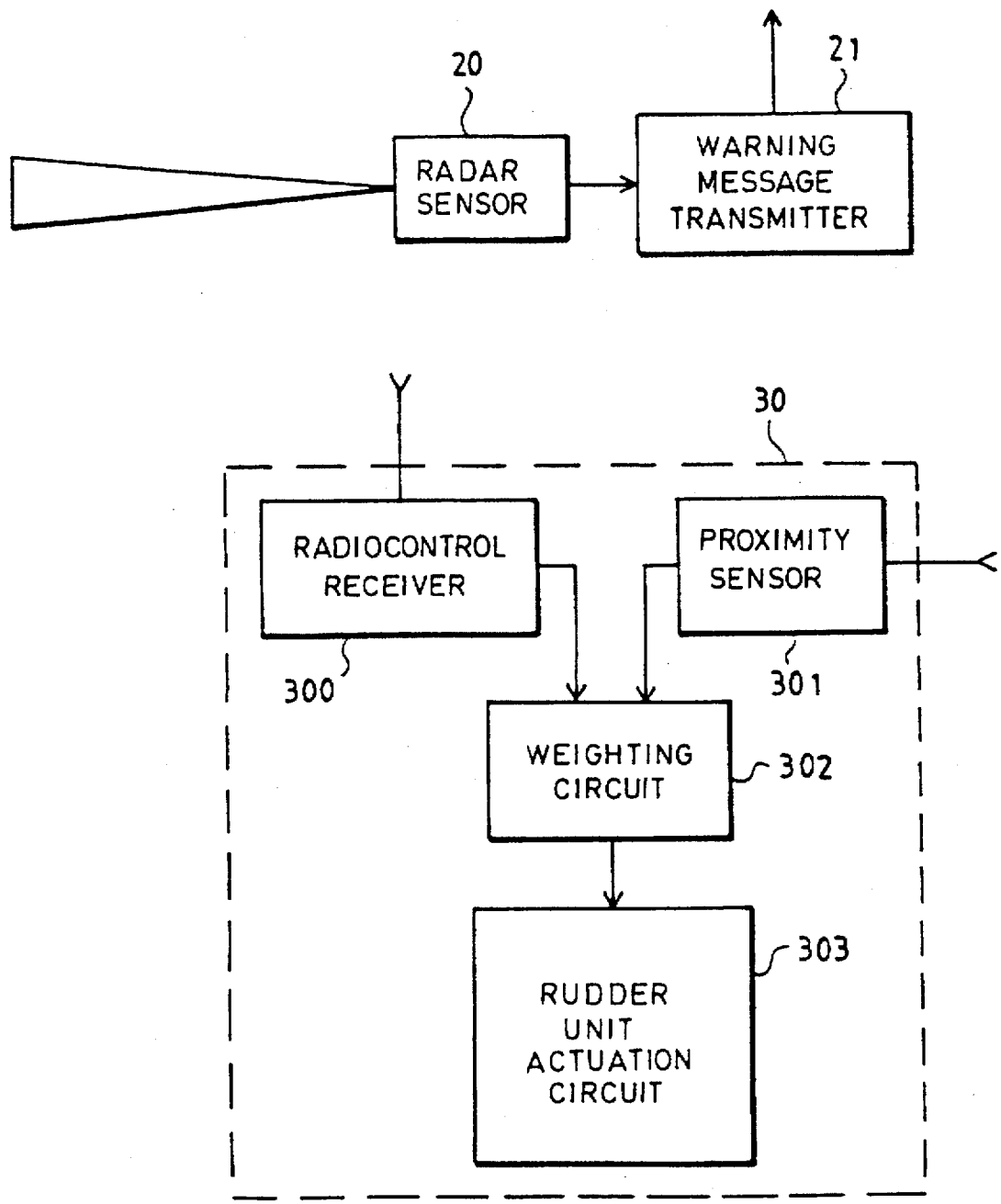
FIG. 3 is a block diagram of the equipment of a drone.

The independent navigation system 30 of a drone comprises, as can be seen in FIG. 3, a radiocontrol receiver 300, a proximity sensor 301, an instructed value weighting circuit 302 and a circuit 303 for the actuation of the rudder unit of the drone.

The radiocontrol receiver 300 is tuned to the transmission frequency of the radiocontrol transmitter 10 of the ship 1 and is provided with a circuit for the detection of the apparent frequency of transmission of the radiocontrol transmitter 10 of the ship 1 which generates an instructed value of radius of curvature for the path of the drone deduced from the apparent transmission frequency of the transmitter 10 of the ship 1. In addition, it has a deactivation command detection circuit.

The proximity sensor 301 is mounted in the rear of the platform of a drone and is sensitive to the frequency of transmission of the radar sensor 20 of another drone. It has two staged sensitivity thresholds. There is an upper threshold that is crossed when the signal picked up, coming from a radar sensor of another drone, is far too powerful and indicates the excessively great proximity of this other drone and a lower threshold below when the signal picked up, coming from the radar sensor of another drone, is far too weak and indicates that it is at an excessively great distance from this other drone. When it is illuminated by a power radar wave above its upper threshold, it generates an instructed value for reducing the radius of curvature of the path of the drone whereas when it is not illuminated by a radar wave or when it is illuminated by a power radar wave below its lower threshold, it generates an instructed value for increasing the radius of curvature of the path of the drone.

The circuit 302 for the weighting of the instructed values of radius of curvature receives, firstly, the instructed value of radius of curvature generated by the frequency detection circuit of the radiocontrol receiver 300 and, secondly, a possible instructed value for reducing or increasing the radius of curvature generated by the proximity sensor 301 and delivers a weighted instruction of a radius of curvature used by the circuit 303 for the actuation of the rudder unit of the drone.

The scattering of the drones is done as follows:

The ship 1 actuates its radiocontrol transmitter 10 at a transmission frequency corresponding to the radius of curvature desired for the path of the drones, namely the distance at which it is desired that the drones should rotate.

The drones are then launched one by one at regular intervals.

A drone, when it is launched, moves away at a decreasing speed from the ship for it receives an apparent frequency from the radiocontrol transmitter of the ship which, because of the Doppler effect, is below the instructed value frequency. This makes it adopt a radius of curvature for its path that is below the instructed value. Since, as a result of this, the speed at which it moves away decreases, the Doppler effects has an increasingly smaller effect on the instructed value of radius of curvature which increases up to the desired value. As a result, a drone, when it is launched, describes a spiral path that gradually turns into a circle.

If, during its route, a drone perceives that it is being followed at an excessively close distance by another drone owing to the crossing of the upper threshold of sensitivity of its proximity sensor, it reduces its instructed value of radius of curvature to increase its angular speed on its curved path around the ship and escapes the drone that is following it.

If, on the contrary, a drone perceives that the drone following it is at an excessively great distance owing to the fact that the lower threshold of sensitivity of its proximity sensor has not been crossed, it increases its instructed value of radius of curvature to reduce its angular speed on its curved path around the ship and allows its pursuer to catch up with it.

Thus, risks of inter-drone collision and of gaps in the monitoring coverage are averted without its being possible for such a thing to happen unexpectedly through local variations in the conditions of propagation due, for example, to localized zones of rain or fog. Indeed, the arrival of a drone in an area of rain or fog has the immediate consequence of reducing the signal picked up by its proximity sensor (this reduction is related to atmospheric losses). The drone therefore perceives that the drone following it is no longer in the range of its sensor owing to the fact that the lower threshold of sensitivity has not been crossed and adapts its instructed value of radius of curvature accordingly.

If, for one reason or another, such as the moving of the ship or a drifting of the drone, the drone no longer has the ship at the center of curvature of its path, the distance from the ship to the drone varies in that they are either closer to each other or further away from each other. If the are closer to each other, a Doppler effect occurs, increasing the apparent frequency received by the drone coming from the radiocontrol transmitter of the ship. This increase of the apparent frequency received from the radiocontrol transmitter leads to a correlative increase of the instructed value of radius of curvature which tends to open the path of the drone and consequently to move it away from the ship. If they are further away from each other, there is a contrary Doppler effect that diminishes the apparent frequency received by the drone from the radiocontrol transmitter of the ship. This decrease in apparent frequency received from the radiocontrol transmitter leaves to a correlative decrease of the instructed value of radius of curvature which tends to further narrow the path of the drone and consequently bring it closer to the ship.

As a result, a drone tends always to circle the ship even if the ship is moving.

The instructed value of radius of curvature of the path of the drones from which the frequency of operation of the radiocontrol transmitter of the ship is determined is set up as a function of the number of drones to be deployed and the range of their radar sensor. This instructed value increases with the number of drones.

The system forms an independent and sturdy detection barrier that does not require any complex path control means on the part of the ship deploying it.

For the retrieval of the drones, it is possible to stipulate an individual retrieval command for each of them. This command will be sent out by the ship and received on board each drone by adapted reception means that prompt a gradual and substantial decrease in the radius of curvature to bring the drone to the proximity of the ship before stopping its propulsion system.

Instead of being deployed around a single ship, the drones may be deployed around a fleet. FIG. 4a shows a configuration with two ships 1 and eight drones 2, FIG. 4b a triangular configuration of three ships 1 and nine drones 2 and FIG. 4c a linear configuration of three ships 1 and ten drones 2. To do this, each ship 1 is fitted out with a radiocontrol transmitter transmitting in a particular frequency range and each drone 2 is fitted out with a multiple radiocontrol receiver that is tuned to the various ranges of frequency of the radiocontrol transmitters of the ships 1 and that gives as many instructed values of radius of curvature as there are ships 1 fitted out with radiocontrol transmitters. These different instructed values of radius of curvature are applied, with a possible instruction for the modification of a radius of curvature coming from the proximity sensor, to the input of the weighting circuit which therefrom deduces a single weighted instructed value of radius of curvature applied to the rudder unit actuation circuit. Since the ships of the fleet are dispersed over a certain surface area, they can no longer be at the center of curvature of the path of the drones so that their distances from the drones vary. This results, for the drones, in apparent and contradictory modifications of the instructed values of radius of curvature received from the different ships. The conflicts are resolved by the weighting circuit. This circuit may be a fuzzy logic circuit and may bring about a variation of the weighting coefficients as a function of the instructed values of radius of curvature received. It gives the greatest importance to the instructed values corresponding to the greatest radii of curvature so as to be certain that the path of the drones surrounds the entire fleet.

FIG. 5 illustrates the autonomous navigation circuit 30' of a drone designed to work with several radiocontrol transmitters distributed over several ships. The circuit is distinguished from the circuit 30 of FIG. 3 by the fact that the radiocontrol receiver is a multiple receiver with parallel stages 300', 300", 300'" each tuned to the frequency range of a radiocontrol transmitter and each delivering an instructed value of radius of curvature at input of the weighting circuit 302'.

Naturally, the present invention is not limited to the exemplary embodiment described but can take the form of many variants accessible to those skilled in the art without departing in any way from the spirit of the invention. It is thus that the invention may be the object of terrestrial applications for forward surveillance around one or more low-speed mobile points.

What is claimed is:

1. A method for controlling flight paths of a plurality of drones, each of said plurality of drones being in flight about at least one radio-control transmitter and each comprising a transmitter and a receiver, said method comprising the steps of:

transmitting a control signal from respective of the at least one radio-control transmitter, each control signal being transmitted at a different frequency corresponding to the at least one radio-control transmitter from which the control signal was transmitted, each control signal having a frequency which corresponds to an instructive value of radius of curvature to be generally followed by at least a subset of said, drones and which increases and decreases with said instructed value of radius of curvature;

receiving each control signal with said receiver in respective of said drones;

detecting at respective of said drones instructive values of radius of curvature corresponding to the different apparent frequencies of the control signals;

weighting at each of said drones the instructive values of radius of curvature and forming a weighted instruction value of radius of curvature; and actuating a rudder unit in respective of said drones so as to guide respective of said drones along respective paths corresponding to said weighted instruction value of radius of curvature that was formed in each of said drones in said weighting step.

2. The method of claim 1, further comprising the steps of:

detecting at each of said drones whether a relative distance from one of said drones is closer than a predetermined distance to another of said drones; and modifying said weighted instruction value so as to increase said relative distance if in said detecting step said another of said drones is closer than said predetermined distance.

3. The method of claim 1, further comprising the steps of:

detecting at each of said drones whether a relative distance from one of said drones is further than a predetermined distance to another of said drones; and modifying said weighted instruction value so as to decrease said relative distance if in said detecting step said another of said drones is detected as being farther than said predetermined distance.

4. The method of claim 1, further comprising the steps of:

detecting at each of said drones whether a relative distance at which one of said drones is being followed by another of said drones is closer than a predetermined distance; and reducing said radius of curvature of said path for said one of said drones that detects in said detecting step that said another drone is following closer than by said predetermined distance.

5. The method of claim 1, further comprising the steps of:

detecting at each of said drones whether a relative distance at which one of said drones is being followed by another of said drones is greater than a predetermined distance; and increasing said radius of curvature of said path for said one of said drones that detects in said detecting step that said another drone is following by greater than said predetermined distance.

6. A drone flight control system, comprising:

at least one radio-control transmitter, each radio-control transmitter comprising a radio frequency transmitter being located at a respective reference point and each being configured to transmit a control signal having a frequency which corresponds to an instructed value of radius of curvature to be generally followed by at least a subset of said drones, which increases and decreases with said instructed value of radius of curvature and which is different than for other control signals; and a plurality of airborne drones arranged in respective flight paths about said at least one radio-control transmitter, each of said plurality of drones comprising, a receiver configured to receive each control signal at the different frequencies, a detection circuit configured to determine apparent frequencies of the different frequencies of the control signals and determine corresponding instructive values of radius of curvature, said instructive values of radius of curvature each corresponding to a radius of curvature for a flight path followed by said drone, a weighting circuit configured to weigh, the instructive values of radius of curvature and form a weighted instruction value of radius of curvature, and a rudder unit configured to guide said drone along said flight path in accordance with said weighted instruction value of radius of curvature.

7. The system of claim 6, wherein each of said plurality of drones further comprises a proximity sensor that senses positions of at least another one of the plurality of drones and produces a modified weighted instruction value in response to said at least another one of the plurality of airborne drones being in a predetermined range.

8. The system of claim 7, wherein said proximity sensor is configured to detect when a distance from another one of the plurality of airborne drones is less than a predetermined distance and respond by changing said modified weighted instruction value so that said rudder unit changes an angular speed of the drone unit and causes said drone to move away from said another drone unit.

9. The system of claim 7, wherein said proximity sensor is configured to detect when a distance from another one of the plurality of drones is greater than a predetermined distance and respond by changing said modified weighted instruction value so that said rudder unit changes an angular speed of the drone so as to move closer to said another drone.

10. The system of claim 7, wherein said weighting circuit comprises a fuzzy logic circuit.

* * * * *